United States Patent [19]

Labar

[11] 4,152,495

[45] May 1, 1979

[54] FOAMED THERMOPLASTIC RESIN COMPOSITION CONTAINING MULTIPLE STAGE POLYMERIC MODIFIERS

[75] Inventor: Russell A. Labar, Yardley, Pa.

[73] Assignee: Rohm and Haas Company, Philadelphia, Pa.

[21] Appl. No.: 674,196

[22] Filed: Apr. 6, 1976

[51] Int. Cl.$^2$ .................. B29D 27/00; C08F 256/06; C08J 9/04
[52] U.S. Cl. ........................................ 521/134; 264/51; 264/211; 264/DIG. 17; 264/DIG. 83; 521/82; 521/91; 521/95; 521/97; 521/98; 521/138; 521/139; 521/140
[58] Field of Search ................... 264/DIG. 83, 54, 51, 264/53, 512 U, DIG. 17; 260/876 R; 521/134, 82, 91, 95, 97, 98, 138, 139, 140

[56] References Cited

U.S. PATENT DOCUMENTS

| | | | |
|---|---|---|---|
| 3,792,122 | 2/1974 | Fromuth | 260/876 R |
| 3,833,686 | 9/1974 | Grochowski et al. | 260/876 R |
| 3,856,719 | 12/1974 | Miyamoto et al. | 260/876 R X |
| 3,859,384 | 1/1975 | Carty et al. | 260/876 R |
| 3,859,389 | 1/1975 | Carty et al. | 260/876 R X |
| 3,983,296 | 9/1976 | Purvis et al. | 264/51 X |

OTHER PUBLICATIONS

Glanvill, A. B. and E. N. Denton, "Injection-Mould Design Fundamentals", American Edition, New York, The Industrial Press, c, 1965, pp. 72-77.

*Primary Examiner*—Philip Anderson
*Attorney, Agent, or Firm*—Michael B. Fein; Lester E. Johnson

[57] ABSTRACT

Certain polymeric modifiers are surprisingly effective for injection molding and extruding thermoplastic structural foam of lower density, improved appearance, more uniform cell structure, and for lowering injection molding cycle time.

3 Claims, No Drawings

FOAMED THERMOPLASTIC RESIN COMPOSITION CONTAINING MULTIPLE STAGE POLYMERIC MODIFIERS

BACKGROUND OF THE INVENTION

1. Field of the Invention

This invention relates to thermoplastic foam processing and products.

2. Description of the Prior Art

Thermoplastic structural foams are fabricated by two main processes: injection molding and extrusion. Both processes for producing foams yield products which do not have uniform cell structure and do not have low densities. In addition, foamed parts made by the injection process have unusually long cooling times.

Various attempts have been made to reduce part weight and cycle time and to produce more uniform cell size of injection molded and extruded structural thermoplastic foam. Partially effective results have been achieved with a multiple stage modifier having a first stage polymerized from MMA and EA in a 15/10 weight percent ratio and 75 weight percent of second stage from MMA. However that material did not achieve sufficiently low densities, cycle times, and final part appearance to meet the needs of this industry.

SUMMARY OF THE INVENTION

It is an object of the present invention to provide a modifier for thermoplastic foam processing which allows for lower densities, more uniform cell size, better appearance, and lower cycle time in injection molded and extruded structural thermoplastic foam.

Another object is to provide improved thermoplastic structural foam articles.

These objects, and others as will become apparent from this disclosure, are achieved by providing and using a multiple stage polymer having a soft first stage and a hard non-crosslinked final stage with a final stage solubility parameter, $\delta$, of 8.7 to 9.3, the final stage having been polymerized from at least about 5% by weight $C_1$ to $C_{12}$ alkyl acrylate, the multiple stage polymer being substantially non-grafted between stages. In another aspect, the invention comprises a process of producing structural foam comprising extruding or injection molding a blend of thermoplastic polymer and about 1 to 20% by weight of the multiple stage polymer described above. Another aspect of the invention is the foamed article produced by the above process.

DETAILED DESCRIPTION OF THE INVENTION AND THE PREFERRED EMBODIMENTS

Injection molding and extrusion have been used to produce foamed plastics from a variety of thermoplastic polymers such as polystyrene, ABS, polycarbonate, polypropylene, polyethylene, polyphenylene ethers, polyethylene terephthalate, polypropylene terephthalate, mixtures thereof, and the like. Generally these foams are produced with a blowing agent which can be any of a variety of chemical blowing agents which release a gas upon thermal decomposition or the blowing agent can be a gas such as $N_2$, $CO_2$ or Freon. In addition to the blowing agents, inert fillers such as talc and glass are frequently added to the thermoplastic to either improve to cell quality of the foam via nucleation or to give better physical properties to the resultant foamed article.

The modifiers disclosed herein can replace some or all of the talc or other nucleation agents previously used.

It has been found that to achieve the objectives of this invention with a polymeric modifier, several aspects of the modifier are important.

First, the modifier must be a multiple stage polymer, preferably two stages, with little or no graftlinking between stages.

Second, the first stage should be a crosslinked rubbery polymer having a $T_g$ below about 0° C., i.e., this polymer is "soft" or "rubbery."

Third, the final stage should be non-crosslinked but "hard" or "glassy," having a $T_g$ above about 50° C. Alkyl methacrylate polymers are hard, but it has been found to be very important that at least about 5% by weight, preferably at least about 10% by weight, of the final stage polymer should be from $C_1$ to $C_{12}$ alkyl acrylate, which lowers the $T_g$ below that of polymers of exclusively alkyl methacrylate.

Fourth, the final stage should have a solubility parameter, $\delta$, of 8.7 to 9.3.

Fifth, the first stage should be polymerized in the absence of graftlinking monomer, resulting in substantially no graftlinking between stages.

The modifier use level in the thermoplastic foam is preferably about 1 to 20% by weight. Below 1%, little or no effect is observed, and above 20% is uneconomical and does not increase the beneficial effect substantially.

The modifiers are prepared by first preparing the first stage by emulsion polymerizing a monomer system so as to form a crosslinked polymer having a $T_g$ below 0° C. Suitable monomer systems are (a) conjugated dienes such as butadiene or isoprene, optionally containing minor amounts of monoethylenically unsaturated monomers such as styrene, methyl methacrylate, acrylonitrile, and the like; (b) at least 75% by weight $C_1$ to $C_{12}$ alkyl acrylate or vinyl acetate with 0.01 to 5% by weight polyethylenically unsaturated crosslinking monomer such as divinyl benzene, divinyl esters of di- or tribasic acids such as divinyl adipate, diallyl esters of polyfunctional acids such as diallyl phthalate, divinyl ethers of polyhydric alcohols such as divinyl ether of ethylene glycol, and di- and trimethacrylic and acrylic esters of polyhydric alcohols such as ethylene glycol dimethacrylate, 1,3-butylene glycol, dimethacrylate, and the corresponding acrylic esters.

No graftlinking monomer, i.e., polyfunctional monomer which has ethylenic unsaturation of different reactivities from each other, such as, for example, allyl methacrylate, as included in the first stage monomer system.

In embodiments wherein the first stage monomer system is (a) some graftlinking is probably inevitable, but conditions to reduce graftlinking as much as possible are most preferred.

Stages subsequent to the first are polymerized under conditions to avoid new particles by keeping an insufficient supply of emulsifier so that the emulsifier level remains below the critical micelle concentration.

No crosslinking monomer is included in the final stage.

The final stage hard polymer is polymerized in the presence of the first stage preformed latex. The monomer system for the final stage is polymerized from a monomer system comprising at least about 50% by weight $C_1$ to $C_6$ alkyl methacrylate and at least about 5% by weight $C_1$ to $C_{12}$ alkyl acrylate, with optional inclusion of other monoethylenically unsaturated monomers, provided the $T_g$ of the final stage polymer is at least about 50° C.

After polymerization of the final stage is complete, the modifier is isolated by conventional spray dry or coagulation techniques.

The modifier is added to the thermoplastic polymer before processing, at levels of about 1 to 20% by weight.

It has been found that density reductions of 20% or more can be obtained, along with a 45% reduction in injection molding cycle time, depending on conditions, modifier concentration, and particular thermoplastic polymer.

Having described the invention in considerable detail, the following examples are presented to illustrate a few embodiments.

EXAMPLE 1

This example illustrates preparation of modifier in accordance with the invention and certain comparative modifiers outside the invention.

To a reaction vessel is charged 400 parts deionized water, 10 parts of a 10% by weight of solution of sodium lauryl sulfate, and 0.1 parts glacial acidic acid at 45° C. To the rapidly stirred mixture is added 100 parts of the first stage monomer system. The mixture is purged then with nitrogen for thirty minutes, and 0.17 parts of diisopropylbenzene hydroperoxide is added, followed by a dilute aqueous solution of sodium formaldehyde sulfoxylate, causing a strong exotherm. After completion of polymerization of the first stage, the temperature is raised to 85° C. and then the second stage reactants and initiator are added over a period of one hour until complete polymerization. The resultant polymer is isolated by spray-drying. The resultant polymers have the compositions set forth in Table I, depending on the particular monomers and ratios used in each stage.

The following abbreviations are used to represent the indicated monomers. Single slashes are used between monomers in a single stage and separate stages double slashes in the abbreviations used herein. The weight ratios of monomers in the polymers are separated by corresponding slashes. The levels of crosslinker and graftlinker are based on first stage monomer.

EA — ethyl acrylate
BDA — butylene glycol diacrylate
Sty — styrene
IBoMA — isobornyl methacrylate
MMA — methyl methacrylate
Bd — butadiene
AlMA — allyl methacrylate

TABLE I

| Composition | Weight Ratio | % Acrylate In Final Stage |
|---|---|---|
| A. EA/BDA//MMA/EA | 47/0.13//40/13 | 25 |
| B. EA/BDA//MMA/EA | 47/0.13//45/8 | 15 |
| C. EA/BDA//MMA/EA | 47/0.13//43/10 | 19 |
| D. EA/BDA//MMA/EA | 47/0.13//37/16 | 30 |
| E. BA/BDA//MMA/EA | 47/0.13//40/13 | 25 |
| F. EA/BDA//MMA/EA | 47/0.13//48/5 | 10 |
| G. EA/BDA//MMA/ST | 60/0.13//32/8 | 0 |
| H. EA/BDA//MMA/EA | 47/0.13//50/3 | 5 |
| I. EA/BDA/AlMA//MMA/EA | 47/0.7/0.7//40/13 | 25 |
| J. Bd/Sty//MMA/EA | 36/11//40/13 | 25 |
| K. EA/BDA//IBoMA | 47/0.13//53 | 0 |
| L. EA/BDA//MMA | 47/0.13//53 | 0 |
| M. EA/BDA/AlMA//MMA/EA | 47/0.13/0.13//40/13 | 25 |
| N. MMA/EA//MMA | 15/10//75 | 0 |
| O. MMA/EA | 90/10 | 0 |
| P. TALC | — | — |

EXAMPLES 2 to 21

These examples illustrate injection molding using the modifiers of the invention and comparative materials outside the invention, with polystyrene as the thermoplastic polymer. A ⅛ inch thick, 3 inch diameter foamed disk was made on a Newberry one ounce injection molder at an injection pressure of 200 psi., back pressure of 100 psi., injection time of 2 seconds, mold temperature of 85° F., and blowing agent level of 0.6%. Minimum density parts were obtained by reducing the shot size until a short shot was achieved and then increasing the shot back up to a full part. Minimum part weights were made with a 70 second cycle time. The minimum cooling time was achieved by reducing the cooling time until noticeable puffing of the disk surface was observed. Results at melt temperatures of 500° F. and 5% by weight modifier concentration are set forth in Table II. Surface appearance rating was on a scale of 1 to 5 with 1 meaning no distortion and 5 meaning gross distortion.

TABLE II

| Example | Modifier | Inside or Outside Invention | Part Wt. | Cooling Time (Sec) | Surface Appearance at 40 Sec. Cooling Time |
|---|---|---|---|---|---|
| 2 | A | Inside | 16.0 | 35 | |
| 3 | E | Inside | 16.6 | 45 | |
| 4 | G | Outside | 16.0 | 50 | |
| 5 | I | Outside | 16.7 | 55 | |
| 6 | J | Outside | 17.0 | 55 | |
| 7 | K | Outside | 17.0 | 50 | |
| 8 | L | Outside | 17.3 | 50 | |
| 9 | M | Outside | 17.0 | 55 | |
| 10 | None(control for Examples) 2 to 9 | Outside | 16.8 | 55 | |
| 11 | A | Inside | 15.8 | 40 | 1 |
| 12 | B | Inside | 15.8 | 40 | 1 |
| 13 | C | Inside | 15.2 | 45 | 2 |
| 14 | D | Inside | 16.2 | 40 | 1. |
| 15 | F | Inside | 16.0 | 45 | 2–3 |
| 16 | H | Outside | 16.1 | 50 | 5 |
| 17 | L | Outside | 16.3 | 50 | 5 |
| 18 | None(control for Examples 11–17) | Outside | 16.3 | 50 | 5 |
| 19 | None(control for Examples 20–23) | | 16.6 | 50 | 5 |
| 20 | O | Outside | 16.3 | 45 | 4 |
| 21 | N | Outside | 16.8 | 40 | 3 |
| 22 | P | Outside | 17.8 | 40 | 3 |
| 23 | A | Inside | 16.0 | 35 | 1 |

EXAMPLE 22

This example illustrates extrusion of high impact polystyrene foam with the modifiers of the invention.

A mixture of high impact polystyrene and 1% by weight of azobisformamide as chemical blowing agent in a high speed mixer was extruded at a die temperature of 290° F. using 5 wt. % modifier A. The extrudate has substantial density reduction as compared to the unmodified high impact polystyrene control.

EXAMPLE 23

This example illustrates the use of a modifier of the invention on a large scale manufacturing machine.

A polystyrene structural foam box was made under low pressure using nitrogen as the blowing agent. The box measured 10" × 9½" × 9", was approximately ½" thick at the thickest part and weighed approximately 4 pounds. The part was shot from a centrally located single nozzle and was made on a 300 ton press. Using 5 wt. % modifier A, a cooling time reduction of 25% and a part weight reduction of 8 to 10% were obtained.

EXAMPLE 24

Example 23 is repeated, except using as the thermoplastic polymer instead of polystyrene the following: polyphenylene oxide ether (Noryl ®  injection molding grade); ABS; polycarbonate; polypropylene; polyethylene; polyethylene terephthalate; polypropylene terephthalate.

Modifier A functions to improve these thermoplastics in a similar manner.

I claim:

1. A low density uniform cell structure thermoplastic foam produced by extruding or injection molding a blend of (a) a thermoplastic polymer selected from the group consisting of polystyrene, poly(phenylene oxide ether), acrylonitrile-butadiene-styrene polymers, polycarbonate, polypropylene, polyethylene, polyethylene terephthalate, and polypropylene terephthalate; (b) about 1 to 20% by weight of a multiple stage polymer comprising at least two stages, the first stage being a crosslinked rubbery polymer polymerized in the absence of a graftlinking monomer from a monomer system comprising at least about 75% by weight of ($C_1$ to $C_{12}$)alkyl acrylate, vinyl acetate, butadiene, or mixtures thereof, and, when butadiene is not present, about 0.01 to 5% by weight polyethylenically unsaturated crosslinking monomer, the crosslinking monomer having two approximately equal reactive sites of unsaturation, and having a $T_g$ below about 10° C.; the second stage being a non-crosslinked hard polymer having a $T_g$ above about 50° C., and a solubility parameter, $\delta$, of 8.7 to 9.3, having been polymerized from a monomer system comprising about 50 to 95% by weight ($C_1$ to $C_6$)alkyl methacrylate, at least about 5% by weight ($C_1$ to $C_{12}$)alkyl acrylate, and, optionally, up to 45% by weight other monoethylenically unsaturated monomers; and (c) about 0.6% by weight blowing agent.

2. A low density uniform cell structure thermoplastic foam produced by extruding or injection molding a blend of (a) polystyrene; (b) about 1 to 20% by weight of a multiple stage polymer comprising at least two stages, the first stage being a crosslinked rubbery polymer polymerized in the absence of a graft linking monomer from a monomer system comprising at least about 75% by weight of ($C_1$ to $C_{12}$)alkyl acrylate, vinyl acetate, butadiene, or mixtures thereof, and, when butadiene is not present, about 0.01 to 5% by weight polyethylenically unsaturated crosslinking monomer, the crosslinking monomer having two approximately equal reactive sites of unsaturation, and having a $T_g$ below about 10° C.; the second stage being a non-crosslinked hard polymer having a $T_g$ above about 50° C., and a solubility parameter, $\delta$, of 8.7 to 9.3, having been polymerized from a monomer system comprising about 50 to 95% by weight ($C_1$ to $C_6$)alkyl methacrylate, at least about 5% by weight ($C_1$ to $C_{12}$)alkyl acrylate, and, optionally, up to 45% by weight other monoethylenically unsaturated monomers; and (c) about 0.6% by weight blowing agent.

3. The polystyrene foam of claim 2 produced by injection molding high impact polystyrene foam at reduced cycle times.

* * * * *